(12) United States Patent
Marsters

(10) Patent No.: US 12,556,518 B2
(45) Date of Patent: Feb. 17, 2026

(54) CONDITIONAL SSH TUNNELING AS A POLICY ENFORCEMENT POINT FOR SEAMLESS ZERO TRUST INTEGRATION

(71) Applicant: Bank of America Corporation, Charlotte, NC (US)

(72) Inventor: John-David Stuart Marsters, London (GB)

(73) Assignee: Bank of America Corporation, Charlotte, NC (US)

( * ) Notice: Subject to any disclaimer, the term of this patent is extended or adjusted under 35 U.S.C. 154(b) by 74 days.

(21) Appl. No.: 18/581,510

(22) Filed: Feb. 20, 2024

(65) Prior Publication Data

US 2025/0267128 A1 Aug. 21, 2025

(51) Int. Cl.
 *H04L 29/06* (2006.01)
 *H04L 9/40* (2022.01)

(52) U.S. Cl.
 CPC ........ *H04L 63/029* (2013.01); *H04L 63/0435* (2013.01); *H04L 63/1425* (2013.01); *H04L 63/306* (2013.01)

(58) Field of Classification Search
 None
 See application file for complete search history.

(56) References Cited

U.S. PATENT DOCUMENTS

| | | | |
|---|---|---|---|
| 6,769,000 B1 | 7/2004 | Akhtar et al. | |
| 7,213,068 B1 | 5/2007 | Kohli et al. | |
| 7,698,453 B2 | 4/2010 | Samuels et al. | |
| 7,969,876 B2 | 6/2011 | Samuels et al. | |
| 8,233,392 B2 | 7/2012 | Samuels et al. | |
| 8,310,928 B2 | 11/2012 | Samuels et al. | |
| 8,411,560 B2 | 4/2013 | Samuels et al. | |

(Continued)

FOREIGN PATENT DOCUMENTS

| | | |
|---|---|---|
| CN | 112154639 A | 12/2020 |
| CN | 109565505 B | 6/2021 |

(Continued)

*Primary Examiner* — Maung T Lwin
(74) *Attorney, Agent, or Firm* — Banner & Witcoff, Ltd.

(57) ABSTRACT

Enhanced security for Zero Trust networks is provided by SSH-customized tunnel clients/tunnel servers, a catalog service, and loopback address DNS mechanisms. Systems and methods provide Policy Enforcement Point (PEP) layer enhancements, strategically positioning the PEP between the user and the network resource. It manages network traffic flows and provides moderate control granularity, near-real-time enforcement decisions, low overheads, and broad applicability to TCP/IP traffic through modified tunneling implementations of Secure Shell (SSH). Unique use of SSH tunneling is utilized and adapted to selectively filter tunnel requests based on user entitlements, ensuring secure and authorized access to network resources. This method entails detailed assessment of tunneling requests, DNS manipulation, and the use of loopback address space for traffic redirection, all without requiring modifications to client-side applications. The approach significantly enhances network security by controlling access based on continuous verification of user entitlements, addressing the shortcomings of traditional network security models.

20 Claims, 4 Drawing Sheets

(56) References Cited

U.S. PATENT DOCUMENTS

| | | | |
|---|---|---|---|
| 8,824,490 | B2 | 9/2014 | Samuels et al. |
| 8,856,910 | B1* | 10/2014 | Rostami-Hesarsorkh .................... H04L 63/1408 713/168 |
| 9,008,100 | B2 | 4/2015 | Samuels et al. |
| 9,171,172 | B2 | 10/2015 | Goldschlag et al. |
| 9,294,508 | B2 | 3/2016 | Goldschlag et al. |
| 10,585,682 | B2* | 3/2020 | Jain ......................... G06F 9/451 |
| 11,711,401 | B2* | 7/2023 | Solari ................... H04W 12/06 726/3 |
| 11,722,519 | B1* | 8/2023 | Agrawal ............. H04L 63/1466 726/23 |
| 2003/0226017 | A1* | 12/2003 | Palekar ............... H04L 63/0428 713/168 |
| 2015/0332043 | A1 | 11/2015 | Russello |
| 2017/0374070 | A1 | 12/2017 | Shah et al. |
| 2018/0198828 | A1 | 7/2018 | Nakamoto et al. |
| 2022/0353244 | A1* | 11/2022 | Kahn ....................... H04L 67/12 |
| 2023/0229758 | A1* | 7/2023 | Terpstra ................ G06F 21/572 726/26 |
| 2024/0388606 | A1* | 11/2024 | Mihajlovic ......... H04L 63/0823 |
| 2025/0039145 | A1* | 1/2025 | Dekel ................. H04L 63/0263 |
| 2025/0039152 | A1* | 1/2025 | Shwartz .................. H04L 63/08 |
| 2025/0220001 | A1* | 7/2025 | Wang .................. H04L 63/0428 |

FOREIGN PATENT DOCUMENTS

| | | |
|---|---|---|
| CN | 114500005 A | 5/2022 |
| WO | 2009032097 A1 | 3/2009 |
| WO | 2013103959 A2 | 7/2013 |
| WO | 2018013925 A1 | 1/2018 |

* cited by examiner

CONDITIONAL SSH TUNNELING AS A POLICY ENFORCEMENT POINT FOR SEAMLESS ZERO TRUST INTEGRATION

TECHNICAL FIELD

The present disclosure relates to the field of information security and, more particularly, to protecting information and systems from unauthorized access, use, disclosure, disruption, modification, or destruction with Zero Trust (ZT) security models and network access control.

DESCRIPTION OF THE RELATED ART

In traditional network security, such as the "Castle and Moat" approach, a user or device is trusted once inside the network. This security approach has become increasingly inadequate due to the evolving nature of cyber threats and the shift towards more dynamic and distributed computing environments, like cloud computing and remote work. This presents a need for a more robust and dynamic approach to network security.

In contrast to traditional "Castle and Moat" security, where the focus is on the protection of the network perimeter, the Zero Trust model attempts to reduce implicit trust by applying robust security controls regardless of whether a user or device is inside or outside the primary network. In a Zero Trust framework, trust is never assumed and must be continually evaluated.

The Zero Trust paradigm emphasizes the need to move away from traditional authentication and authorization practices where a user's identity is checked just once to establish a long-lasting session. Instead, it advocates for continuous revalidation, ensuring that users are consistently verified and authorized throughout their session, rather than relying solely on a single initial authentication event. This approach significantly enhances security by reducing the risk associated with prolonged session access without ongoing verification.

Implementing continuous authentication in different applications introduces several challenges. For example, in the case of streaming media, it is not always clear what defines a 'transaction' that would trigger re-authentication. Additionally, in applications that require low latency or handle high volumes of data, the extra authentication checks may lead to significant performance impacts. Balancing the need for constant authentication with these operational constraints is a complex task.

The growing focus on Zero Trust as a framework for modern cybersecurity has led to the term becoming somewhat overused, particularly by security vendors who rebrand their products as ZT solutions. This trend has caused confusion about what Zero Trust truly entails and how enterprises can effectively implement it. To clarify, several key documents and guidelines have been developed, notably by the US National Institute of Standards and Technology (NIST) within their Cybersecurity Framework.

NIST publications delineate the necessary technical architecture for Zero Trust. They underscore the importance of a powerful security 'engine' capable of processing vast amounts of data, including system telemetry, user behavior analytics, and context metadata. This process involves analyzing the data to extract security insights and then utilizing enforcement technologies to restrict application access based on these insights. The architecture of the system breaks down its functionalities into several core components. The Policy Information Point(s) (PIP) handle the intake of data. The Policy Decision Point (PDP) is where decisions about access are made, utilizing the latest contextual information. The Policy Enforcement Point(s) (PEP) are where these decisions are executed to control access. Lastly, the Policy Administration Point (PAP) allows administrators to create and modify the policies governing the system. This structure ensures efficient and secure management of access control within the framework.

Integrating Zero Trust security measures has typically entailed significant modifications to an application's setup or codebase, processes that can be intricate and prohibitively expensive, particularly for native thick-client applications where common web solutions like proxying might not be viable.

Hence, there is a long felt need, within a Zero Trust architecture, to implement ZT controls that are cost-effective, easy to deploy, and capable of utilization without requiring extensive alterations to existing applications. Modernizing internal network architectures to align with Zero Trust principles is vital, especially as cloud adoption advances alongside existing legacy non-cloud infrastructures. Traditional "Castle and Moat" security models, which have led to broadly open internal networks, expose vulnerabilities to a large number of internal users, including insider threats, and any external user who breaches the perimeter. Implementing Policy Enforcement Point (PEP) technologies offers a significant advantage by ensuring users access only the applications for which they have entitlements, thereby limiting the exposure of vulnerabilities.

SUMMARY OF THE INVENTION

In accordance with one or more arrangements of the non-limiting sample disclosures contained herein, solutions are provided to address one or more of the above network security issues and problems by, inter alia, focusing on the Policy Enforcement Point layer in the Zero Trust architecture, strategically positioning the PEP between the user and the resource to which access is sought, managing network traffic flows. This helps to minimize the size of the implicit trust zone where users are automatically considered safe, and provides ZT systems and methods that offer moderate (per-application) control granularity, near-real-time enforcement decisions, low overheads and a broad applicability to nearly all TCP/IP traffic, through modified tunneling implementations of Secure Shell (SSH).

SSH is a protocol for encrypted network communication between two connected computers. It employs public-key cryptography for the authentication of both the remote computer and the user. SSH ensures a secure channel over an unsecured network, typically in a client-server model, linking an SSH client with an SSH server. Within this protocol, there are mechanisms to forward data streams within the encrypted channels, including the capability for TCP/IP traffic forwarding. This forwarding, controlled by server-side security measures, can be initiated by the client, and TCP/IP connections may be allowed to originate from either the client or server end. The inventions disclosed herein focus on the forward direction, where the listening end of the tunnel is client-side, and a connection is made from the server side through to the target application service. Unlike traditional SSH services that allow or deny tunnel requests on a user basis without more detailed control, the ZT systems and methods disclosed herein have adapted the SSH service to selectively filter tunnel requests. This is done by assessing the specific entitlements a user holds, allowing for more nuanced and secure management of tunneling requests in line with user permissions. In other words, an alternative implementation of the SSH service is utilized and is modified to filter tunnel requests based on the existing entitlements of the user.

Each tunneling request undergoes a detailed assessment process. The process starts by identifying the target hostname specified in the request, which indicates the user's intended destination. This hostname is then compared against a database of known application servers. The next step involves verifying if the user is authorized for that particular application by checking their entitlements. If the user lacks the necessary permissions for the targeted application, the tunneling request is denied. This ensures a higher level of security by allowing only authorized users access to the application servers and significantly reduces potential risks associated with vulnerabilities in applications by controlling and restricting access strictly to users who have legitimate entitlements. This method of managing tunnel requests helps maintain robust application security in network environments. Implementing this tunneling approach utilizes a custom SSH client on the client side. For each potential application target, a corresponding listening socket is used on the client side, which serves as the tunnel's starting point. The system positions itself as a PEP by intercepting traffic between the client and the intended resource. It cleverly reroutes this traffic into specifically designed tunnels, bypassing the need to modify client-side applications. This seamless redirection is achieved through a sophisticated combination of DNS manipulation and utilizing the loopback address space (either by controlling DNS responses locally on the user's computing device or as implemented in an enterprise DNS), directing the traffic flow into the secure tunnels established by the system (i.e., from tunnel client to tunnel server).

The innovative methods disclosed herein involve intercepting the Domain Name System (DNS) resolution process. Normally, client applications connect to service hosts using hostnames that are translated into IP addresses through DNS lookups. By altering the DNS query results, these connection attempts are redirected to the tunneling service rather than to the application server directly. This ensures that any direct connection attempts to the application using an IP address are denied, under the assumption that the application is configured to only accept traffic from our tunneling services.

To facilitate secure application access for authorized users, the system employs DNS overrides for each application a user is entitled to access. This reroutes traffic intended for a specific target server to a unique loopback address on the user's device, as recorded in a central directory (i.e., either local or in an enterprise DNS). Local TCP listening sockets are established on these loopback addresses, corresponding to the designated ports for each application. These sockets act as the entry points to SSH tunnels. When an application client, like a web browser, attempts to connect to a service, the DNS resolution is adjusted to point to the designated loopback address with a local listener. Connections to this listener then trigger a request for a secure tunnel through our tunnel service, which validates the user's access rights before establishing the connection to the intended target.

The essential component for enforcing security is to ensure that all user traffic to protected applications is channeled through the tunneling system. This can be achieved by configuring the applications to only recognize traffic from tunnel servers, or by situating the tunnel servers at the juncture of two network segments. By doing so, firewall rules can be established to permit only traffic that has traversed the tunnels into the application zone. While network segmentation is not strictly necessary, it is preferred for deployments on an enterprise scale.

The system utilizes the existing cryptographic protocols outlined in the SSH standard, particularly for authentication through SSH key pairs. These key pairs employ asymmetric cryptography, where the client has a private key, and the server holds the corresponding pre-shared public key. Security is enhanced by assigning individual key pairs for each user-device combination, with the private keys securely encrypted and stored on the client device. These keys are purposed solely for tunnel establishment and do not grant any additional privileges, such as shell access. Enrolling these keys necessitates a reliable and authenticated process to ensure they truly represent the user-device identity. This enrollment is a one-time process, required at the initial setup or when keys are renewed.

The process for the tunnel server (TS) involves:
a. Accepting an incoming connection to its designated TCP port.
b. Receiving the provided username and device ID, representing the user-device pairing.
c. Fetching the corresponding public key from the Redis database for that user-device pair.
d. Authenticating the user-device based on the SSH key (terminating if authentication fails).
e. Handling the session, where multiple tunnel requests can be processed simultaneously:
  i. Taking in requests for tunnel connections.
  ii. Checking the authenticated user's current entitlements.
  iii. Linking the requested target server to an authorized application (ending the process if there is no match).
  iv. Ensuring the user is authorized for the application based on their entitlements.
  v. Establishing the tunnel to the target if authorized or denying access if not.

In some arrangements, the final step of confirming and creating the tunnel, based on the user's entitlements, could be effectively augmented by introducing an additional verification step in the tunnel setup sequence. This would involve sending the connection request and its associated metadata to the Policy Decision Point (PDP) system. The PDP would then return a decision to either allow or deny the connection, or potentially to defer it, which could trigger a request for additional authentication measures, such as Multi-Factor Authentication (MFA), before proceeding. In each case where a tunnel request is not immediately established within an active connection session, any additional information such as error messages may be passed back to the tunnel client and displayed to the user-on-a-device (UoD).

The tunnel client (TC) is tasked with establishing tunnel entry points. The TC can handle DNS redirection by altering hostname resolutions to point to loopback addresses that serve as tunnel entry points, based on application metadata from the Catalog Service. The assignment of loopback (127.x.x.x) addresses is handled in the CS. When a new application is added and its metadata set up, the CS selects (randomly, sequentially, or other as desired) unused 127- addresses to map to the 'real' target addresses for the application. This facilitates distribution of the loopback addresses, either to the TCs doing local DNS interception, or to an enterprise DNS service, and ensures that all local app clients are aware of the address to be used. Additionally, the TC can incorporate user interface elements for user interactions and alerts.

The primary flow for the TC can be summarized as:
a. Display Authentication Dialog via CS: An authentication dialog is shown to the user through the Catalog Service (CS).
b. Generate UoD Key Pair and Store in User Profile: A key pair for the UoD is generated and stored in the user's profile.
c. Upload Public Key to CS: The public key from the UoD key pair is uploaded to the Catalog Service.
d. Fetch TS Addresses per App from CS and Establish Connections: The system retrieves primary and secondary TS addresses for each application from the CS and establishes connections to these TSs using public key authentication.
e. Set Up Tunnel Entrances on Loopback Addresses/Ports: Tunnel entrances are set up on designated loopback addresses and ports.
f. Display Error to UoD (if applicable): If there are errors during the process, they are displayed to the user.
g. Complete Tunnel Setup and Tunnel Traffic: The setup of the tunnel is finalized, and tunnel traffic can commence.

In some arrangements, end users can view and interact, through the Catalog Service's web interface, with launch icons for all the applications they are authorized to use within the tunnel system. By clicking these icons, users can initiate local app launches or access additional information, such as support details, related to these applications.

The Catalog Service (CS) can include perform functionalities of data services and UI services. Within the tunnelling platform's standard architectural framework, the CS's data services align with the Policy Information Point (PIP) layer, handling all incoming data that will be utilized by the Policy Decision Point (PDP) functionality within the TS. This data is distributed to TS instances using Redis (or the like) as a distributed data store. The CS offers APIs for application and UoD enrollment, public key management, and metadata about TS deployments, including application routing restrictions.

In some arrangements, the CS can provide a web-based user interface over HTTPS. This interface can allow users to view a catalog of applications protected by the tunnelling system, including their entitlements, and facilitate direct entitlement requests, and it can provide a user interface for the TC.

In some arrangements, a method for managing network security within a Zero Trust (ZT) architecture can include one or more steps such as:
a. providing a dedicated tunnel client (TC) for application access within a network, each TC having the capability to initiate a secure shell (SSH) tunneling request;
b. assigning a dedicated tunnel server (TS) to each said TC, each said TS located at a network segmentation point;
c. initiating, for each request for said application, an SSH tunneling request by the TC to the TS, including specifying a hostname for the application;
d. accessing, by the TS, a catalog service (CS) to obtain entitlements and access rights for said application;
e. caching, by the TS, a local copy of data from the CS to verify said entitlements and said access rights for said application prior to establishing a dedicated SSH tunnel in response to said request;
f. establishing, if said entitlements and said access rights are verified, the dedicated SSH tunnel from the TC to the TS to the application using loopback addresses on the user's local device provided by a DNS enterprise server or by the CS via local DNS interception;
g. limiting traffic flow for the application to only the dedicated SSH tunnel through the use of a firewall at the network segmentation point;
h. routing network traffic uniquely for each said application based on the hostname via the dedicated SSH tunnel through the firewall and the TS;
i. continuously monitoring and managing said network traffic for said application within the dedicated SSH tunnel;
j. dynamically updating access controls and routing based on real-time assessments of application-specific entitlements, network conditions, and catalog service data;
k. terminating or modifying the dedicated SSH tunnel based on changes in said entitlements or said access rights;
l. logging and analyzing tunneling activities for each application for security auditing and compliance purposes;
m. encrypting data traffic within each SSH tunnel using advanced encryption protocols;
n. performing deep packet inspection at the tunnel server to detect and mitigate potential security threats;
o. periodically updating the catalog service database to reflect changes in user entitlements and application access rights;
p. utilizing machine learning algorithms at the tunnel server to predict and prevent unauthorized access;
q. implementing multi-factor authentication at the tunnel client before initiating an SSH tunnel request;
r. generating real-time alerts for potential security breaches;
s. integrating the system with cloud-based services for scalability and remote management;
t. configuring the firewall to apply different security policies based on the type of application requesting network access; and/or
u. assigns loopback addresses by a DNS enterprise server (or local DNS controller/forwarder).

In some arrangements, the firewall includes an automated response system to immediately isolate compromised network segments.

In some arrangements, each application has a TC and a TS, which may be dedicated if desired. In other arrangements, a TS may handle multiple applications/TCs.

In some arrangements, a method for managing network security within a Zero Trust (ZT) architecture can include one or more steps such as, for example:
a. providing a tunnel client (TC) for application access within a network, said TC having the capability to initiate a secure shell (SSH) tunneling request;
b. assigning a tunnel server (TS) to said TC, said TS located at a network segmentation point;
c. initiating, in response to an access request for said application, an SSH tunneling request by the TC to the TS, including specifying a hostname for the application;
d. accessing, by the TS, a catalog service (CS) to obtain entitlements and access rights for said application;
e. caching, by the TS, a local copy of data from the CS to verify said entitlements and said access rights for said application prior to establishing a dedicated SSH tunnel in response to said request;

f. establishing, if said entitlements and said access rights are verified, the dedicated SSH tunnel from the TC to the TS to the application using loopback addresses provided by a DNS enterprise server or by the Catalog Server via local DNS interception;

g. limiting traffic flow for the application to only the dedicated SSH tunnel through the use of a firewall at the network segmentation point;

h. routing network traffic uniquely for each said application based on the hostname via the dedicated SSH tunnel through the firewall and the TS;

i. terminating or modifying the dedicated SSH tunnel based on changes in said entitlements or said access rights; and/or j. logging and analyzing tunneling activities for each application for security auditing and compliance purposes.

In some arrangements, a network security system within a Zero Trust (ZT) architecture can comprise one or more of:

a. a Policy Enforcement Point (PEP) layer configured to be positioned between a user and a network resource;

b. network segmentation implemented to divide the network into distinct security segments;

c. tunnel servers located within each network segment for managing Secure Shell (SSH) tunneling requests;

d. means for managing network traffic flows based on user entitlements through these segments;

e. an adapted SSH tunneling mechanism including tunnel clients for selectively filtering tunnel requests, wherein the SSH tunneling is modified to assess tunneling requests and enforce network access control within each segment;

f. a DNS manipulation module configured to redirect traffic on the initiating device through the use of loopback address space;

g. a real-time decision-making component for near-real-time enforcement of access controls within segments;

h. a control granularity module for providing moderate control over TCP/IP traffic without necessitating modifications to client-side applications within each segment;

i. a catalog service integrated with the PEP layer for maintaining and verifying user entitlements and access rights in conjunction with the SSH tunneling mechanism;

j. an advanced encryption module within the SSH tunneling mechanism, configured to encrypt data traffic within each SSH tunnel, thereby enhancing data security across the network segments, said advanced encryption module operating in conjunction with the real-time decision-making component; and/or k. a deep packet inspection (DPI) module integrated with each tunnel server, designed to analyze data packets in real-time for detecting and mitigating potential security threats, said DPI module working in tandem with the control granularity module to apply differentiated security measures based on the nature and sensitivity of the traffic within each network segment.

In some arrangements, each UoD will run one TC, and that TC will open up multiple listening TCP sockets on multiple loopback addresses. Each application has its own dedicated TCP socket(s), but there is only one TC instance on the device to provide service for all applications installed on the UoD.

In some arrangements, such as if the UoD needs to support multiple concurrent users, multiple TC instances per device may be used wherein each TC instance corresponds to a single user. Modifications can be made, for example, by separating out 127.x.y.z space and allocating some bits of x to an instance ID, if local DNS interception is being utilized.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
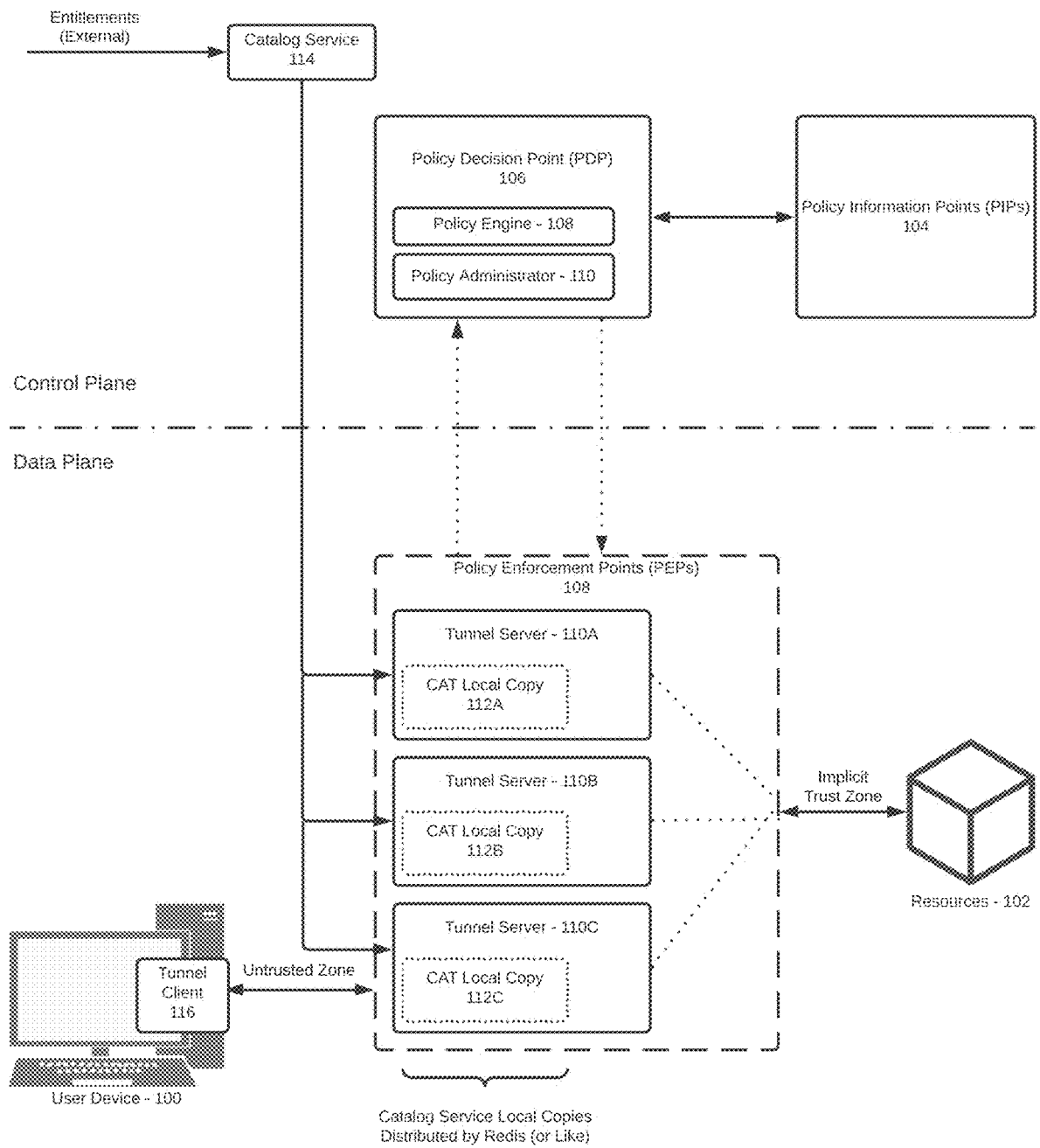
FIG. 1 depicts an exemplary architectural diagram showing sample interactions, interfaces, steps, functions, and components in accordance with one or more aspects of this disclosure as they relate to a Zero Trust network structure, highlighting the separation of control and data planes, and detailing the flow and management of access and policy decisions.

In the following description of the various embodiments to accomplish the foregoing, reference is made to the drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general computer/network/software components, machines, or the like are not depicted in the interest of brevity or discussed herein in detail because they are known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting reference, FIG. 1 depicts an exemplary architectural diagram showing sample interactions, interfaces, steps, functions, and components in accordance with one or more aspects of this disclosure as they relate to a sophisticated Zero Trust network structure, highlighting the separation of control and data planes, and detailing the flow and management of access and policy decisions.

FIG. 1 includes the following components:
  a. User Device (100): Represents the endpoint from which a user accesses the network and attempts to access resources on or through the network.
  b. Resources (102): These are the assets or services within the network that users need to access.
  c. Policy Information Points (PIPs) (104): These ZT components provide necessary data for making access decisions. Policy Information Points (PIPs) in a Zero Trust network are critical components responsible for gathering and providing relevant data to inform access control decisions. They act as data sources, supplying the Policy Decision Point (PDP) with necessary information about users, devices, and context. This data can include user credentials, device status, network conditions, and more. PIPs ensure that the PDP has up-to-date and comprehensive information, enabling it to make accurate and secure decisions about granting or denying access to network resources. The effectiveness of a Zero Trust network heavily depends on the quality and timeliness of the data provided by PIPs.
  d. Policy Decision Point (PDP) (106): The Policy Decision Point (PDP) in a Zero Trust architecture plays a pivotal role in determining access control. It processes information received from Policy Information Points (PIPs), like user identity, device security status, and context of the access request. Based on this data and the predefined security policies, the PDP makes informed decisions about whether to grant or deny access to network resources. It then communicates these decisions to Policy Enforcement Points (PEPs) which enforce them accordingly. The PDP's ability to accurately assess and make decisions is crucial for maintaining the security and integrity of the Zero Trust network.
  e. Policy Engine (108) and Policy Administrator (110): These functions in the PDP in the ZT environment manage and enforce security policies across the network. The Policy Engine and Policy Administrator are integral components of the Policy Decision Point in a Zero Trust network. The Policy Engine is responsible for processing the data received from the Policy Information Points (PIPs) and making access control decisions based on the network's security policies. It evaluates the context, user credentials, and device status to determine whether access should be granted or denied. The Policy Administrator, on the other hand, is tasked with managing and updating the security policies that the Policy Engine uses to make its decisions. It ensures that the policies are current, comprehensive, and in line with the overall security strategy of the organization. This role might involve adding new policies, modifying existing ones, or removing outdated policies to adapt to evolving security needs and threats.
  f. Control Plane/Data Plane: In a Zero Trust network architecture, the Control Plane and Data Plane serve distinct functions. The Control Plane is responsible for managing and implementing the network's security policies. It makes decisions regarding who can access what resources under which conditions. This involves processing and interpreting policy rules, user credentials, and other relevant information. The Data Plane, on the other hand, is where the actual data transmission takes place. It's the layer through which user requests and information travel. The Data Plane is responsible for handling the data as directed by the policies set by the Control Plane, ensuring that only authorized data packets are allowed to reach their intended destinations within the network.
  g. Tunnel Client (116): Facilitates secure access to the network. They reside on the user's device and are responsible for initiating secure connections. In this implementation, they listen on various loopback addresses (127.x.x.x) to create multiple secure endpoints, one for each service the user has access to. They can be implemented via local DNS services on the user device or on an enterprise DNS in the network.

h. Policy Enforcement Points (PEPs) (108): Policy Enforcement Points (PEPs) in a Zero Trust architecture are critical components responsible for implementing access control decisions made by the Policy Decision Point (PDP). They are strategically located within the network to intercept access requests to resources. PEPs enforce the security policies by allowing or blocking these requests based on the decisions received from the PDP. Their role is to ensure that only authenticated and authorized users or devices gain access to protected network resources, thereby maintaining the security and integrity of the network environment. Effective PEP implementation is key to the success of a Zero Trust strategy, as they act as gatekeepers to sensitive resources.

i. Tunnel Servers (110A, 110B, 110C): The Tunneling Server (TS) in the disclosed Zero Trust architecture is vital for managing secure, encrypted connections. It operates as the endpoint for the SSH tunnels established by the Tunnel Client. When a user or device initiates a connection, the TS validates the request based on predefined security policies and user entitlements. If the request is authorized, the TS establishes a secure tunnel, enabling encrypted communication between the user and the TS, and from there to the desired network resource. This process ensures that data in transit is protected, maintaining the security and confidentiality essential in a Zero Trust environment. The TS's role in mediating and securing these connections is crucial for the overall effectiveness of the network's security framework. The Tunneling Servers act as policy enforcement points. They receive connections from tunnel clients and validate them against distributed entitlements, which are kept updated and synchronized using a distributed caching system like Redis.

j. (External) Catalog Service (114): The Catalog Service (CS) in a Zero Trust architecture functions as a central repository that manages and distributes data related to network access and security policies. It is responsible for storing and providing information about users, their devices, application entitlements, and public keys. The CS plays a critical role in authenticating and authorizing users and their devices for access to network resources. For example, in a corporate network, the CS might contain details about employee access levels, the devices they use, and the specific applications they are entitled to use. When an employee tries to access a network resource, the CS provides the necessary information to verify their identity and permissions.

k. CAT Local Copies (112A, 112B, 112C): Local instances of the Catalog Service data. A local instance or copy can be contained in each TS. Catalog Service local copies can be distributed by Redis (or the like) as desired.

l. Implicit Trust Zone: Area of the network where implicit trust is granted.

In the modified SSH implementation of ZT systems and methods disclosed herein, the mechanisms for data transfer explicitly include provision for forwarding of connection-oriented network traffic, i.e., TCP/IP. Subject to security server-side controls, connection forwarding can be initiated by the client in either direction, with the source end of the forwarding tunnel on either the client or the server side. For illustration purposes, the forward direction is focused on herein as an example, where the listening end of the tunnel is client-side, and a connection is made from the server side through to the target application service.

To create a tunnel, the SSH client opens a listening TCP/IP socket, which acts as the endpoint for any application client connections. When a connection is made to the listening socket, a tunnel request is made of the server over the existing SSH session, and then the sending and receiving streams of the TCP socket are connected to respective data channels within the SSH session, forming the tunnel. The SSH server then makes an outbound TCP connection to the requested address and port, and on successful connection, links the data path for that connection to the server-side end of the tunnel. In this way, the SSH protocol offers an effective and performant way to encapsulate data flows between the SSH client and SSH server in an encrypted, authenticated tunnel.

In the case of standard implementations of SSH services, this mechanism is either allowed or denied for a user, with no finer granularity on individual tunnelling requests. In the inventive ZT systems and methods disclosed herein, an alternative implementation of the SSH service is utilized and is modified to filter tunnel requests based on the existing entitlements of the user. This component is referred to as the tunnel server(s) (e.g., 110A, 110B, 110C . . . 110N).

For each tunnelling request, the target hostname of the request (i.e., where the user is asking to reach) is examined and matched with known application servers. A check is made as to whether a user should be entitled to any access to that application or resource. If no such entitlement exists—and the user has no permissions for the target application—the tunnel request is denied. By ensuring applications only receive traffic via the tunnel services, it can be guaranteed that only existing users of an application can reach its servers, markedly reducing the exposure in case of vulnerabilities in that application.

On the client side, a specially adapted SSH client is used. For each possible app destination, there is a corresponding listening socket on the client side—the near end of the tunnel.

As a PEP solution, the apparatus must be placed between the client and the resource. The ZT systems and methods disclosed herein transparently re-route traffic into the tunnels without requiring rewriting of client applications. This is accomplished by combining the use of DNS manipulation with the nature of the loopback (127.x.x.x) address space to steer traffic into the tunnels.

Regarding DNS manipulation, client-side apps reaching out to application services generally do so by attempting to connect to servers by hostname. To do this, they will request that the target hostname be resolved to an IP address by virtue of a DNS lookup. Caching notwithstanding, any connection attempt will result in a request to the primary DNS server asking for resolution of the server name, and a routable IP address will be returned. The operating system's TCP/IP stack is then used to form a stateful connection with that target routable IP address.

To insert the disclosed PEP technique between the client and the target application, the results of this DNS resolution query are modified. In this way, connection attempts are sent to the inventive tunnelling services instead of directly to the application. Attempts to reach a service directly by IP address would be rejected, assuming that the application only responds to traffic from the tunnel servers.

This can be accomplished by using a local DNS forwarder and position it as the primary DNS server for the user device on the client side. In most cases this forwarder simply passes on any requests to the 'real' DNS subsystem for resolution. However, when a request matches a hostname corresponding to a target application that is protected by tunnelling, it rewrites the result according to a list maintained in a central catalog and copied to the client. This steers the traffic towards the tunnelling infrastructure instead. In a widespread production deployment, the use of the DNS forwarder can be eschewed and instead rely on returning the 'steered' addresses from the main DNS services in an enterprise DNS server.

In the disclosed ZT systems and methods, traffic should be routed uniquely based on the requested application hostname. This is because, for example, if there are three different target applications, each listening on TCP port 443, on their own servers, and intercepts are performed identically for all three and all the requests are pushed to the same target IP address in the tunnelling system, the ability to distinguish which application is being requested is lost. Stated differently, the IP addresses can be manipulated but the target TCP port numbers cannot be changed without changing the applications themselves, which is a goal of the inventions disclosed herein. A client expecting to communicate on port 443 must be sent somewhere that is listening on port 443. In the foregoing example, each of the applications listens on the same port, so all three listening tunnels cannot be placed on the same IP address (each IP address can have only one listener per port). Hence every target application server must have its own unique IP address within the tunnel client system. This can be accomplished by utilizing loopback addresses.

In the standard IP address space, there is an IP address allocated for a loopback address, known as 'localhost', which is at IP address 127.0.0.1. All traffic to this destination is non-routable and remains only on the host where it originates. However, this is actually part of a whole subnet reserved for non-routable traffic. Currently, it is the entirety of 127.0.0.0/8 which belongs to the loopback space, i.e., any IP address beginning with 127. In the case of UNIX hosts, any of the IP addresses in that are in the 127 space can be explicitly added as an IP address alias where can listening tunnel ends can be placed. On Windows, all 127 addresses are automatically treated as available loopback addresses and can be used to place listening services. This gives a total of over 16 million IP(v4) addresses that are available for localhost services.

For each application to which a user holds entitlements, DNS overrides are created that re-route each protected server's traffic to its own uniquely allocated 127.x.x.x address, held in a central registry. Local TCP listening sockets are opened on that 127 address on the user device, one on each relevant target TCP port, according to the mapping list provided by the central catalog. Each listener acts as the near end of an SSH tunnel. When an app client (such as a browser) requests a connection to, say, myApp.myDomain.com:443, and that normally resolves to 172.16.5.4, it may be rewritten to the loopback address space as, for example, 127.88.5.4, and place a listener locally on port 443 on that IP address. Then whenever the client (or browser) connects to the listener, a suitable TS (either one already connected to, or on demand) is accessed, and a tunnel connection is requested all the way through to 172.16.5.4. The TS can verify the user's existing access to the service, and then allow or disallow the tunnel accordingly.

Figure 2:
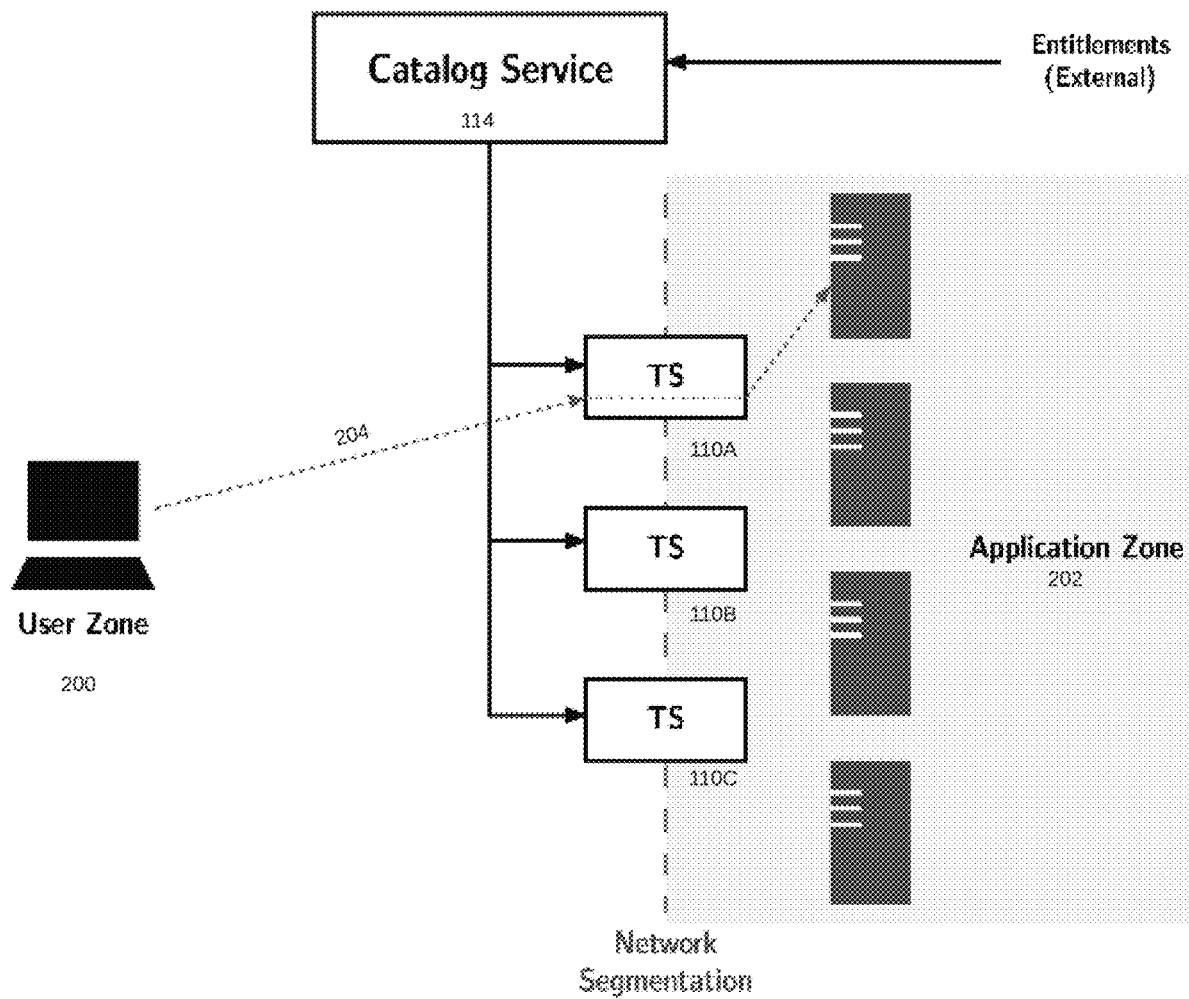
FIG. 2 depicts an exemplary except of an architectural diagram illustrating the Catalog Service potential routing from a TC on a UoD in a user zone through a particular path and TS such as, for example, due to geographical and/or latency preferences in accordance with one or more aspects of this disclosure.

User traffic in a user zone 200 to applications in an application zone 202 can be strictly regulated, requiring all data to pass through the tunneling system for access. This can be enforced by configuring applications to only communicate with tunnel server locations, or by deploying tunnel servers at the demarcation points between different network segments. Firewall rules can then be set up around the application zone, permitting entry exclusively to traffic that has been tunneled, thereby enhancing the security posture. An example of this can be seen in FIG. 2 in which each TS 110A, 110B, 110C, etc. is located at points of network segmentation. FIG. 2 also depicts how traffic can be routed along a particular path 204 to a specific TS 110A and on to a specific application. This may be useful to minimize latency for geographically dispersed applications, tunnel servers, and users.

The ZT systems and methods disclosed here can utilize existing implementations of cryptographic algorithms in the SSH standard. This also applies to the authentication. Traditional SSH key pairs, which use asymmetric cryptography in the form of a private key on the client side and a public key made available to the server in advance of a connection attempt, can be used. A separate key pair can be maintained per user per device, to reduce the risk of keys being copied and re-used by an attacker. Keys can be stored encrypted in the user's profile area on the client device. The keys preferably cannot be used for anything other than establishing tunnels via the tunnel servers, and they convey no additional privilege by themselves. They cannot be used to gain shell access, since the tunnel servers have no way to provide this.

Of course, the SSH key for a user-on-a-device (UoD) must be enrolled in a trusted, authenticated way. Simply having the public key is not enough to trust it—it must be an authentic representation of the identity of a UoD. For the enrollment step, this can be accomplished using a standard, approved method of validating identity prior to accepting any key enrollment. Fortunately, from the perspective of user experience, this is a rare step, and need only be performed once when the client is first used for a specific UoD and only thereafter if expired, etc.

Keys can be enrolled via UoDs by username/password authentication to the Single Sign-On (SSO) identity provider and passed to a central service via HTTPS. Alternatively, Kerberos (or the like) may be used to make the enrollment transparent and passwordless.

Pre-packaging and distributing keys is only necessary for a service account on the UoD (i.e., one that is not capable of human interaction). In all cases involving interaction with a human user, the above enrollment step is performed. It is only if an application is being deployed in a non-interactive account that this key distribution approach or the like would be appropriate.

Though the idea of packaging and distributing private keys with an application may sound less than ideal at first glance, it is worth noting that they can confer no additional privilege beyond what is already available: the absolute worst-case scenario is net neutral. This approach of including the access key would likely only be used in the case of software running on enterprise-managed devices (including virtual desktops), where the end user is unprivileged, and keys are readable solely by the service account running the application.

Figure 3:
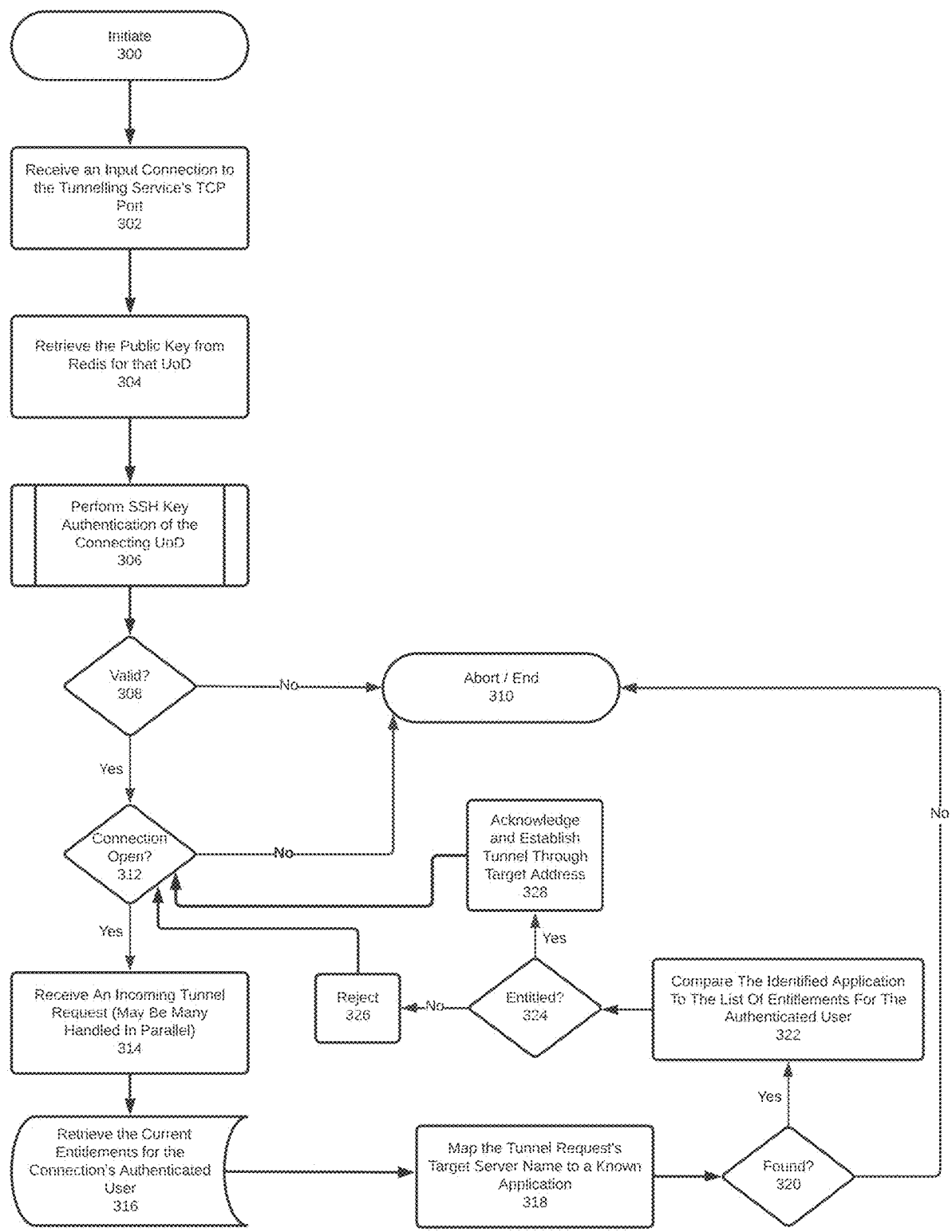
FIG. 3 depicts an exemplary flow diagram showing sample interactions, interfaces, steps, functions, and components in accordance with one or more aspects of this disclosure as they relate to tunnel servers.

By way of non-limiting reference, FIG. 3 depicts an exemplary flow diagram showing sample interactions, interfaces, steps, functions, and components in accordance with one or more aspects of this disclosure as they relate to tunnel servers.

The ZT systems and methods disclosed herein are horizontally scalable because the capacity of the platform can be increased by adding additional TS instances as required. If desired, a dedicated tunnel servers may be used wherein each TS serves only one target application, or a limited subset of target applications. This may be useful where there are restrictions on data segregation (either regional or because of highly sensitive data), or for performance reasons in the case of a particularly latency-sensitive or high bandwidth application.

To support the horizontally scalable architecture, the disclosed ZT systems and methods preferably utilize distributed data storage. This not only avoids the need for TSs to connect back to a single database instance, but it also helps to reduce latency in tunnelling decisions. With a non-distributed data store such as a SQL server, all TSs would have to connect back to a central point to query for user information and entitlements. At the very least, any such implementation would need data to be replicated to multiple global locations to reduce WAN round trip latency. In contrast, using a storage solution designed for distributed data with in-memory local caching, means that the TS (PEP) can apply entitlements with the minimum of latency. Redis or the like can be utilized for this purpose.

Another advantage of the distributed decentralized approach is that the tunnel servers themselves need not maintain individual connections to the enterprise Identity Provider (IdP), again reducing unnecessary requests and latency. By ensuring that the public keys used to identify each UoD are distributed across the Redis cluster (as an example), key exchange can be validated locally with no additional network latency.

The other two key pieces of information distributed via Redis (or the like) and made locally available (see 112A, 112B, 112C, etc.) on all tunnel servers (110A, 110B, 110C, etc.) are the set of metadata for all target applications protected via tunnelling (including the applications' server lists), and the up-to-date map of which users have active entitlements for which target applications. In combination, this allows the TS to make an immediate determination of whether an active user should be allowed to establish a tunnel based on the tunnel's target server.

FIG. 3 outlines the process flow for setting up and managing a secure tunneling connection. It starts with an incoming connection to the Tunneling Service's TCP port, followed by retrieving the public key from Redis for the User-on-Device (UoD). Next, the process involves SSH key authentication of the connecting UoD and checks if the authentication is valid. If valid, the process continues to check if the connection is open, and if so, it receives an incoming tunnel request. Following this, the current entitlements for the authenticated user are retrieved. The next steps involve mapping the tunnel request's target server name to a known application and comparing the identified application to the list of entitlements for the authenticated user. If the user is entitled and the application is found, the tunnel through to the target address is established; otherwise, the request is rejected.

Stated differently, the process can be understood to flow as follows:
a. Incoming Connection: The process begins with an incoming connection to the Tunneling Service's TCP port.
b. Username and Device Identity: The claimed username and device identity (UoD) are received.
c. Public Key Retrieval: The public key for the UoD is retrieved from Redis.
d. SSH Key Authentication: This step involves authenticating the UoD via SSH key. If not valid, the process aborts.
e. Handling Connection: While the connection is open, several sub-steps occur:
  i. Tunnel Request Receipt: Incoming tunnel requests are received and handled in parallel.
  ii. Entitlement Retrieval: The current entitlements for the authenticated user are retrieved.
  iii. Server Name Mapping: The tunnel request's target server name is mapped to a known application.
  iv. Application-Entitlement Comparison: The identified application is compared against the authenticated user's list of entitlements.
  v. Tunnel Establishment: If the user is entitled, the tunnel to the target address is established; otherwise, the request is rejected.

The TS service initiates in 300. An input connection to the TS's TCP port is received in 302. The public key is retrieved for the UoD in 304. An SSH key authentication of the connection UoD is performed in 306. If it is not valid 308, the process aborts 310.

Otherwise, while the connection is open 312, one or more incoming tunnel requests are received (in parallel if desired). Current entitlements for the connections authenticated user are retrieved in 316. The tunnel request's target server name is mapped to a known application in 318. If it is not found 320, the process aborts or ends.

If found, the identified application is compared to the list of entitlements for the authenticated user in 322. If the user is entitled 324, the user request is acknowledged, and the tunnel is established through the target address. If not entitled in 324, the connection is rejected in 326. Errors or other messages may be displayed if desired for any errors, aborts, or terminations. Other instructions such as, for example, how to obtain any missing entitlements may be provided as well if desired.

As described and implemented above, the tunnel service is able to function independent of any other components of the ZT PIP/PDP/PEP architecture. It uses only existing entitlements data and is effectively acting as its own internal PDP as well as PEP. Data ingress for decision-making is via Redis (with upstream components—see Catalog Server discussed below) covering PIP functionality.

To future-proof the design for operation in a more mature ZT environment, with a more advanced distributed PDP 'decision engine', the operation allows for further integration. For example, the last step of the tunnel set-up process "If entitled, acknowledge, and establish . . . " could be directly preceded by an additional step such as: "Query the PDP system with the connection request and relevant metadata, and await an allow/deny/defer decision (where defer may indicate temporary referral to enhanced authentication such as MFA)." In each case where a tunnel request is not immediately established within an active connection session, any additional information such as error messages may be passed back to the tunnel client and displayed to the UoD.

Figure 4:
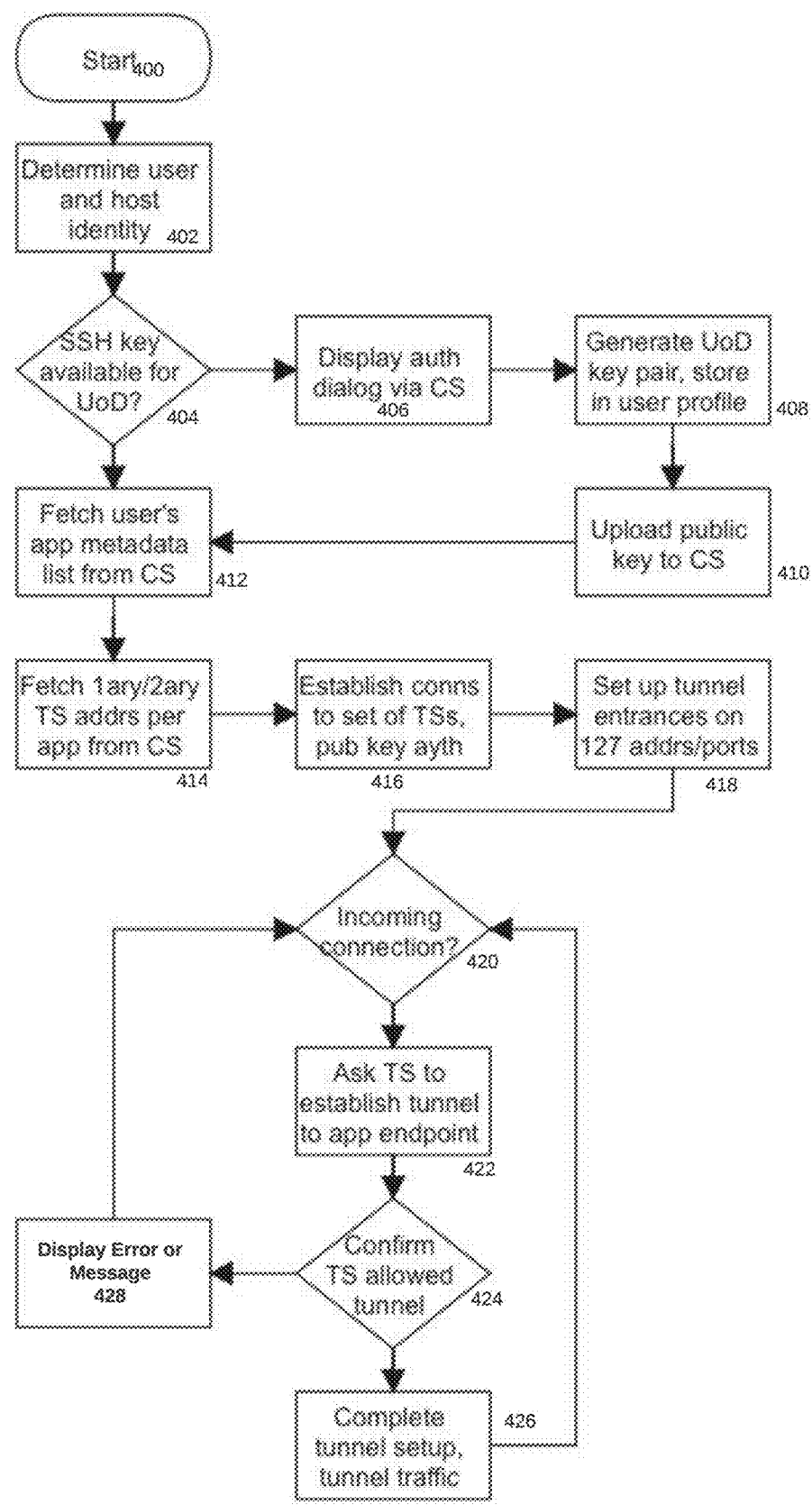
FIG. 4 depicts an exemplary flow diagram showing sample interactions, interfaces, steps, functions, and components in accordance with one or more aspects of this disclosure as they relate to tunnel clients.

By way of non-limiting reference, FIG. 4 depicts an exemplary flow diagram showing sample interactions, interfaces, steps, functions, and components in accordance with one or more aspects of this disclosure as they relate to tunnel clients.

The primary functionality of the TC is to provide the mechanisms for setting up tunnel entrances. In the reference implementation, which does not rely on DNS enterprise infrastructure integration, it also includes the DNS forwarder for traffic interception. This rewrites hostname lookup results to point to loopback 127-addresses corresponding to the tunnel entrance locations, as provided in the application metadata from the CS. However, as noted previously, DNS servers can provide this functionality as well in order to utilize the ZT systems and methods across an enterprise.

In addition to these features for tunnelling, the TC also includes lightweight UI components for user interaction and notifications if desired. For example, for its user interface, the TC can include an icon in the Windows "system tray" notification area. This can allow the end user to launch a skeleton UI frame which is actually a web connection to the Catalog Service (CS) rendered through a Chrome browser component (or the like). In this way, some features exposed by the client related to the user's entitlements catalog may be iterated on without client redeployment, as only the web UI of the CS need be updated. Via the web UI served by the CS, the end user can see launch icons for all of their currently entitled applications protected by the tunnel system. They may choose to launch apps locally by clicking those icons, or access support details or other information about the applications. These and other UIs are within the spirit and scope of the invention and can be implemented as desired.

The flow diagram of FIG. 3 illustrates the process for a tunnel client in a Zero Trust network, starting from user and device identification. It includes steps for authentication via the Catalog Service, generating and storing key pairs, and uploading the public key to the CS. The process further involves fetching application metadata and Tunnel Server addresses, establishing connections to these servers, and setting up tunnel entrances on specified loopback addresses. Errors or messages are displayed as needed. The final steps involve requesting the TS to establish a tunnel to the application endpoint and completing the tunnel setup to begin secure traffic flow. This detailed sequence ensures secure and authorized access to network resources.

The depicted steps can include one or more of the following:
a. Start (400): The process initiation.
b. Determine User and Host Identity (402): Identifying the user and their device.
c. Display Authentication Dialog via CS (404): Showing an authentication interface to the user through the Catalog Service.
d. Generate UoD Key Pair and Store in User Profile (406): Creating a key pair for the User-on-Device and storing it securely.
e. Upload Public Key to CS (408): Sending the public key to the Catalog Service.
f. Fetch User's App Metadata List from CS (410): Retrieving application metadata for the user from the Catalog Service.
g. Fetch Primary/Secondary TS Addresses Per App from CS (412): Obtaining addresses for the Tunnel Servers for each application.
h. Establish Connections to Set of TSs Using Public Key Authentication (414): Setting up secure connections to the Tunnel Servers.
i. Set Up Tunnel Entrances on 127 Addresses/Ports (416): Configuring tunnel entry points on specific loopback addresses and ports.
j. Display Error or Message (418): Presenting any error messages or notifications to the user.
k. Ask TS to Establish Tunnel to App Endpoint (420): Requesting the Tunnel Server to create a tunnel to the application endpoint.
l. Complete Tunnel Setup and Tunnel Traffic (422): Finalizing the setup of the tunnel and starting the flow of tunneled traffic.

The Catalog Service can be broken down into two main areas of functionality: the data services, and the UI services. Though the functionality of the tunnelling platform is primarily focused on providing PEP services within the standard architectural model, (if considered as its own PIP/PDP/PEP microcosm), the data services of the CS are aligned to the PIP layer. It is responsible for all the ingress of any information that will be passed down to the PDP embedded within the TS. Such data can be distributed out to all of the TS instances via the use of Redis (or the like) as the distributed data store.

The APIs provided by the CS cover application enrollment and management, UoD enrollment (for public keys), and metadata about the deployment of TS instances, including any restrictions on which applications may or may not be routed to each TS.

The CS also includes capabilities for serving a web-based user interface over HTTPS. This is used in two ways. Firstly, it provides users access to a catalog of information about applications protected by the tunnelling system and shows the user whether they have entitlements to those applications. Additional integrations can enable users to request missing entitlements directly from within the UI. And secondly, it acts as the source for the user interface displayed by the TC. Additional features within the CS can provide access to system logs and debugging for TS behavior, including a "live" view of all authorization operations within the tunnelling system.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for managing network security within a Zero Trust (ZT) architecture, the method comprising the steps of:
providing a tunnel client (TC) for accessing an application within a network, the TC configured to initiate a secure shell (SSH) tunneling request;
assigning a tunnel server (TS) to the TC, the TS located at a network segmentation point where network segmentation divides the network into distinct security segments;
determining a user and device identity for a user-on-a-device (UoD);
displaying an authentication dialog via a catalog service (CS);
generating a UoD key pair and storing the UoD key pair in a user profile;
uploading a public key from the UoD key pair to the CS;
fetching the user's application metadata list from the CS;
fetching primary and secondary TS addresses per application from the CS;
establishing connections to a set of TSs using public key authentication;
setting up tunnel entrances on loopback addresses and ports;

initiating, by the TC to the TS, the SSH tunneling request for accessing the application, the SSH tunneling request specifying the hostname for the application;

accessing, by the TS, the CS to obtain entitlements and access rights for said application;

caching, by the TS, a local copy of data from the CS to verify said entitlements and said access rights for said application prior to establishing a dedicated SSH tunnel in response to said request;

establishing, if said entitlements and said access rights are verified, the dedicated SSH tunnel from the TC to the TS and from the TS to the application using loopback addresses;

limiting traffic flow for the application to only traffic originating from the TS, through the use of a firewall at the network segmentation point;

routing network traffic uniquely for each said application based on the hostname via the dedicated SSH tunnel through the firewall and the TS;

continuously monitoring and managing said network traffic for said application within the dedicated SSH tunnel;

dynamically updating access controls and routing based on real-time assessments of application-specific entitlements, network conditions, and catalog service data;

terminating or modifying the dedicated SSH tunnel based on changes in said entitlements or said access rights; and logging and analyzing tunneling activities for each application for security auditing and compliance purposes.

2. The method of claim 1, wherein the loopback addresses are assigned by a Domain Name System (DNS) enterprise server or by the CS via local DNS interception.

3. The method of claim 1, wherein the loopback addresses are uniquely allocated per application to enable unique routing based on the hostname without changing target Transmission Control Protocol (TCP) port numbers.

4. The method of claim 1, further comprising encrypting data traffic within each SSH tunnel using advanced encryption protocols.

5. The method of claim 4, including performing deep packet inspection at the tunnel server to detect and mitigate potential security threats.

6. The method of claim 5, wherein the catalog service is updated periodically to reflect changes in user entitlements and application access rights.

7. The method of claim 6, further comprising utilizing machine learning algorithms at the tunnel server to predict and prevent unauthorized access.

8. The method of claim 7, including implementing multi-factor authentication at the tunnel client before initiating an SSH tunnel request.

9. The method of claim 8, wherein the logging and analysis of tunneling activities include generating real-time alerts for potential security breaches.

10. The method of claim 9, further comprising integrating the architecture with cloud-based services for scalability and remote management.

11. The method of claim 10, wherein the firewall includes an automated response system to immediately isolate compromised network segments.

12. The method of claim 11, wherein each said application has a dedicated TS.

13. A method for managing network security within a Zero Trust (ZT) architecture, the method comprising the steps of:

providing a tunnel client (TC) for accessing an application within a network, said TC having the capability to initiate a secure shell (SSH) tunneling request;

assigning a tunnel server (TS) to said TC, said TS located at a network segmentation point where network segmentation divides the network into distinct security segments;

initiating, in response to an access request for the application, an SSH tunneling request by the TC to the TS, including specifying a hostname for the application;

accessing, by the TS, a catalog service (CS) to obtain entitlements and access rights for said application;

caching, by the TS, a local copy of data from the CS to verify said entitlements and said access rights for said application prior to establishing a dedicated SSH tunnel in response to said request;

establishing, if said entitlements and said access rights are verified, the dedicated SSH tunnel from the TC to the TS and from the TS to the application using loopback addresses uniquely allocated per application to enable unique routing based on the hostname without changing target Transmission Control Protocol (TCP) port numbers;

limiting traffic flow for the application to only the dedicated SSH tunnel through the use of a firewall at the network segmentation point; and routing network traffic uniquely for each said application based on the hostname via the dedicated SSH tunnel through the firewall and the TS.

14. The method of claim 13 further comprising the step of: terminating or modifying the dedicated SSH tunnel based on changes in said entitlements or said access rights.

15. The method of claim 14 further comprising the step of: logging and analyzing tunneling activities for each application for security auditing and compliance purposes.

16. The method of claim 15 wherein each user device (UoD) has only one said TC and the TC opens up multiple listening Transmission Control Protocol (TCP) sockets on a plurality of said loopback addresses.

17. The method of claim 16 wherein said TS handles a plurality of the tunnel clients and a plurality of the applications.

18. A network security system within a Zero Trust (ZT) architecture, comprising:

a Policy Enforcement Point (PEP) layer configured to be positioned between a user and a network resource;

network segmentation implemented to divide the network into distinct security segments;

tunnel servers located within each network segment for managing Secure Shell (SSH) tunneling requests;

a network traffic flow manager configured to manage network traffic flows based on user entitlements through these segments;

an adapted SSH tunneling mechanism including tunnel clients for selectively filtering tunnel requests, wherein the SSH tunneling is modified to assess tunneling requests and enforce network access control within each segment;

a processor configured to perform a domain name system (DNS) manipulation to redirect traffic within and across these network segments through the use of loopback address space;

a processor configured for near-real-time enforcement of access controls within segments;

the processor configured to provide control over Transmission Control Protocol/Internet Protocol (TCP/IP)

traffic without necessitating modifications to client-side applications within each segment; and a catalog service integrated with the PEP layer for maintaining and verifying user entitlements and access rights in conjunction with the SSH tunneling mechanism.

19. The network security system of claim 18, further comprising an advanced encryption module within the SSH tunneling mechanism, configured to encrypt data traffic within each SSH tunnel, thereby enhancing data security across the network segments, said advanced encryption module operating in conjunction with the real-time decision-making component to ensure that encryption protocols are dynamically adjusted based on current network conditions and threat levels.

20. The network security system of claim 19, including a deep packet inspection (DPI) module integrated with each tunnel server, designed to analyze data packets in real-time for detecting and mitigating potential security threats, said DPI module working in tandem with the control granularity module to apply differentiated security measures based on a nature and sensitivity of the traffic within each network segment.

\* \* \* \* \*